US012298699B2

(12) United States Patent
Monden

(10) Patent No.: US 12,298,699 B2
(45) Date of Patent: May 13, 2025

(54) IMAGE FORMING SYSTEM

(71) Applicant: CANON KABUSHIKI KAISHA, Tokyo (JP)

(72) Inventor: Noriyuki Monden, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 18/183,254

(22) Filed: Mar. 14, 2023

(65) Prior Publication Data

US 2023/0297018 A1 Sep. 21, 2023

(30) Foreign Application Priority Data

Mar. 16, 2022 (JP) ................................. 2022-041762

(51) Int. Cl.
*G03G 15/00* (2006.01)
*G03G 21/20* (2006.01)

(52) U.S. Cl.
CPC ..... *G03G 15/6582* (2013.01); *G03G 15/5008* (2013.01); *G03G 15/5029* (2013.01); *G03G 15/6552* (2013.01); *G03G 21/20* (2013.01); *G03G 2215/00717* (2013.01); *G03G 2215/00818* (2013.01)

(58) Field of Classification Search
None
See application file for complete search history.

(56) References Cited

U.S. PATENT DOCUMENTS 7,954,813 B2 * 6/2011 Matsumoto ............ B65H 5/062 271/270
8,413,978 B2 4/2013 Watanabe et al.
10,659,641 B2 5/2020 Ikuta et al.
11,086,261 B2 8/2021 Endo
2008/0267644 A1 * 10/2008 Murakami ......... G03G 15/6508 399/45
2022/0146977 A1 * 5/2022 Monden ............. G03G 15/6538
2022/0283534 A1 9/2022 Monden et al.
2023/0183034 A1 * 6/2023 Mitsui .................... B65H 31/36

FOREIGN PATENT DOCUMENTS

JP H06-183174 A 7/1994
JP 2005-047642 A 2/2005
JP 2011-032097 A 2/2011
JP 2019-207310 A 12/2019
JP 2021-014355 A 2/2021

* cited by examiner

*Primary Examiner* — Leslie J Evanisko
(74) *Attorney, Agent, or Firm* — Venable LLP

(57) ABSTRACT

An image forming system includes a punch unit, provided in a post-processing apparatus, which includes a punch member that performs punching processing of forming a punch hole in a sheet conveyed along a conveyance path from an image forming apparatus while the punch member rotates, and a detection unit configured to detect a surface property of the sheet conveyed along a conveyance path from the image forming apparatus toward the punch unit. A control unit controls conveyance of the sheet such that the sheet is conveyed to the punch unit at a conveyance speed corresponding to the detected surface property, and controls rotation of the punch member such that the punch member performs the punching processing on the sheet conveyed from the image forming apparatus while the punch member rotates at a rotation speed corresponding to the conveyance speed.

13 Claims, 7 Drawing Sheets

| | SHEET SURFACE PROPERTIES (TYPE) | |
|---|---|---|
| | PLAIN PAPER | GLOSS PAPER |
| SHEET CONVEYANCE SPEED | 400 mm/sec | 100 mm/sec |
| PUNCHING MOTOR ROTATION SPEED | 1000 pps | 250 pps |

FIG. 7A

TOTAL NUMBER OF PUNCHES < THRESHOLD

| | | SHEET BASIS WEIGHT RANGE | | |
|---|---|---|---|---|
| | | Light | Normal | Heavy |
| ABSOLUTE MOISTURE CONTENT RANGE | Z1 | ○ | ○ | ○ |
| | Z2 | ○ | ○ | × |
| | Z3 | ○ | ○ | × |

FIG. 7B

TOTAL NUMBER OF PUNCHES ≥ THRESHOLD

| | | SHEET BASIS WEIGHT RANGE | | |
|---|---|---|---|---|
| | | Light | Normal | Heavy |
| ABSOLUTE MOISTURE CONTENT RANGE | Z1 | ○ | ○ | × |
| | Z2 | ○ | ○ | × |
| | Z3 | ○ | × | × |

IMAGE FORMING SYSTEM

BACKGROUND OF THE INVENTION

Field of the Invention

The present invention relates to an image processing system including an image forming apparatus and a post-processing apparatus.

Description of the Related Art

Japanese Patent Laid-Open No. 2021-14355 describes a technique in which, in an image forming system including a rotary punch, the punch is rotated while conveying a sheet, and the sheet is punched by the punch in a state where the sheet conveyance speed and the rotation speed of the punch are the same speed. In such an image forming system, sheets are typically conveyed at a predetermined speed if information pertaining to the sheets has not been set by using an operation panel or the like.

Japanese Patent Laid-Open No. 6-183174 describes a technique, in a punching device that punches holes in sheets, for avoiding damage to sheets and device malfunctions by detecting the thickness of a sheet and, if the thickness is at least a predetermined thickness, stopping the punching operations.

However, the ease with which conveyance rollers that convey the sheets slip varies depending on the surface properties of the sheets. For example, if glossy paper, which has a smoother surface than plain paper, is conveyed at the same speed as plain paper, the conveyance rollers can slip. Such conveyance roller slippage is one cause of misalignment of punch holes formed in a sheet by a punch unit (a rotary punch).

Additionally, if a punch unit is overloaded during punching processing, problems will arise in the punch unit, leading to a drop in the quality of the punch holes formed by the punching processing. Loads on a punch unit vary depending on various conditions, and it is therefore desirable to control the punching processing appropriately in consideration of such conditions.

SUMMARY OF THE INVENTION

Accordingly, the present invention provides a technique that enables punching processing to be performed at an appropriate position in a conveyed sheet regardless of the surface property of the sheet.

According to one aspect of the present invention, there is provided an image forming system including an image forming apparatus, and a post-processing apparatus which is connected to a downstream side of the image forming apparatus in a conveyance direction of a sheet and which performs punching processing of forming a punch hole in a sheet conveyed along a conveyance path from the image forming apparatus, the image forming system comprising: a punch unit, provided in the post-processing apparatus, which includes a punch member that performs the punching processing on the sheet conveyed from the image forming apparatus while the punch member rotates; a detection unit configured to detect a surface property of the sheet conveyed along the conveyance path toward the punch unit; and a control unit configured to control conveyance of the sheet such that the sheet is conveyed to the punch unit at a conveyance speed corresponding to the surface property detected by the detection unit, and control rotation of the punch member such that the punch member performs the punching processing on the sheet conveyed from the image forming apparatus while the punch member rotates at a rotation speed corresponding to the conveyance speed.

According to another aspect of the present invention, there is provided an image forming system including an image forming apparatus, and a post-processing apparatus which is connected to a downstream side of the image forming apparatus in a conveyance direction of a sheet and which performs punching processing of forming a punch hole in a sheet conveyed along a conveyance path from the image forming apparatus, the image forming system comprising: a punch unit, provided in the post-processing apparatus, which includes a punch member that performs the punching processing on the sheet conveyed from the image forming apparatus while the punch member rotates; a basis weight detection unit configured to detect a basis weight of the sheet conveyed along the conveyance path toward the punch unit; a temperature and humidity sensor configured to detect a temperature and a humidity in an installation environment of the image forming system; and a control unit configured to control rotation of the punch member such that the punch member performs the punching processing on the sheet conveyed from the image forming apparatus while the punch member rotates at a rotation speed corresponding to a conveyance speed of the sheet, wherein the control unit further controls whether or not to perform the punching processing on the sheet based on at least two of the following: the basis weight detected by the basis weight detection unit; an absolute moisture content in air obtained based on information output from the temperature and humidity sensor; and a total number of times the punching processing is performed by the punch unit.

According to the present invention, punching processing can be performed at an appropriate position in a conveyed sheet regardless of the surface property of the sheet. Furthermore, a punch unit can be prevented from being overloaded during the punching processing.

Further features of the present invention will become apparent from the following description of exemplary embodiments (with reference to the attached drawings).

BRIEF DESCRIPTION OF THE DRAWINGS

FIGS. 7A and 7B illustrate examples of settings tables used to determine whether or not to perform punching operations using a punch unit.

DESCRIPTION OF THE EMBODIMENTS

Figure 1:
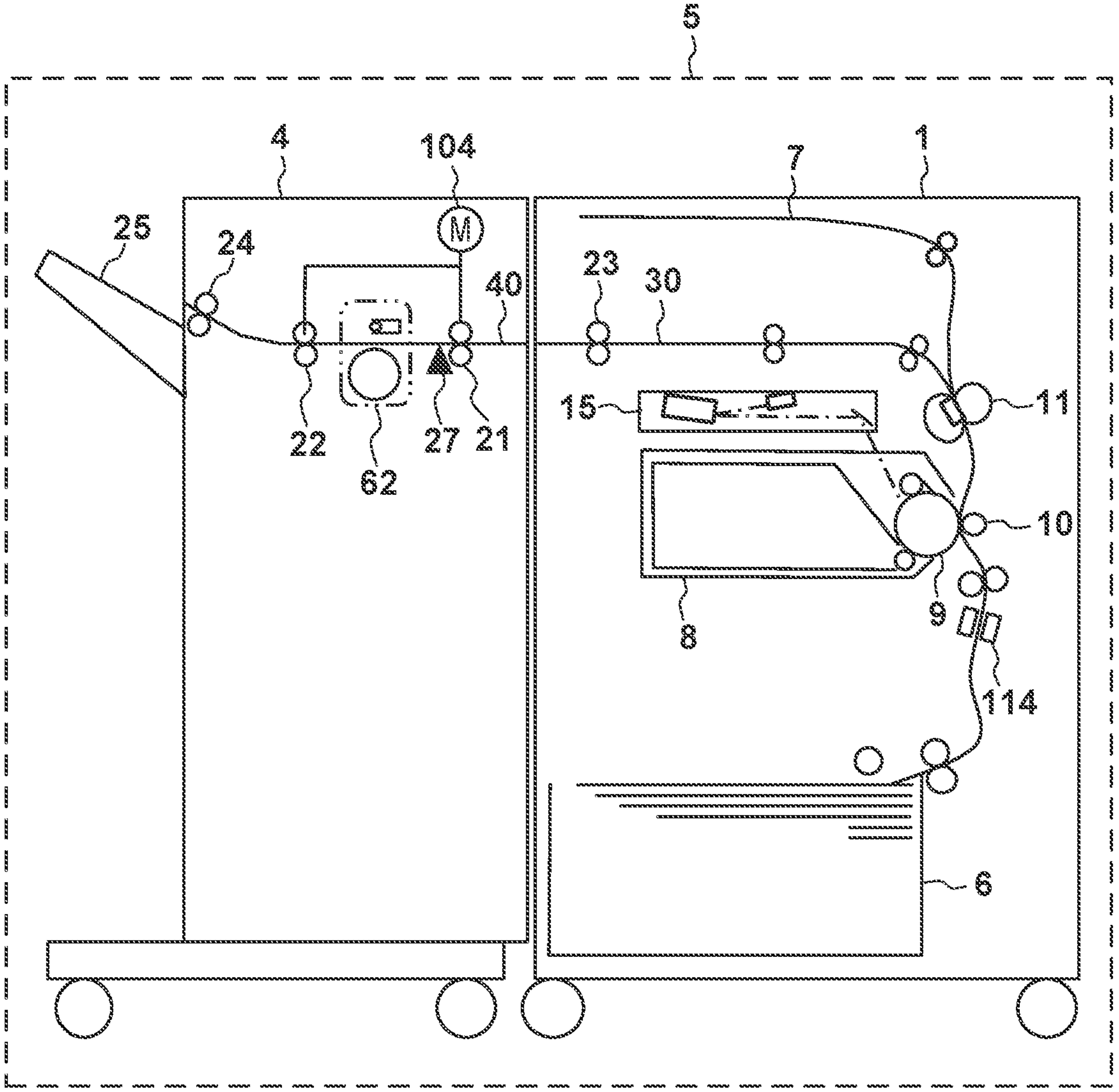
FIG. 1 is a cross-sectional view illustrating an example of the configuration of an image forming system.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Image Forming System>

FIG. 1 is a cross-sectional view illustrating an example of the configuration of an electrophotographic image forming system according to an embodiment of the present disclosure. An image forming system 5 includes an image forming apparatus 1 that forms an image on a sheet, and a post-processing apparatus 4 connected downstream from the image forming apparatus 1 in a conveyance direction of the sheet. The post-processing apparatus 4 performs predetermined post-processing on a sheet onto which an image has been formed by the image forming apparatus 1 and which has been conveyed from the image forming apparatus 1 through a conveyance path, and discharges the post-processed sheet to a tray. In the present embodiment, as the post-processing, the post-processing apparatus 4 performs punching processing for punching a hole (forming a punch hole) at a predetermined position of the sheet conveyed from the image forming apparatus 1 through the conveyance path. Note that the post-processing apparatus 4 may also be called a "sheet processing device".

The image forming apparatus 1 includes a paper feed device 6 capable of holding a plurality of sheets, and a paper type determination device 114 that determines a type of the sheet which is fed. The paper feed device 6 feeds the held sheets one at a time to the conveyance path. The sheet fed from the paper feed device 6 stops once at the position of the paper type determination device 114. The paper type determination device 114 determines the type of the stopped sheet and outputs a determination result. The sheet for which the conveyance is resumed from the position of the paper type determination device 114 is conveyed to a transfer nip portion between a photosensitive drum 9 and a transfer roller 10.

An image forming cartridge 8 includes a charger, a developer, and the photosensitive drum 9. The photosensitive drum 9 is supported by the image forming cartridge 8 in a rotatable state. The image forming apparatus 1 forms an electrostatic latent image on the photosensitive drum 9 by uniformly charging the surface of the photosensitive drum 9 using the charger and then exposing the surface of the charged photosensitive drum 9 with a laser beam based on image data. The exposure of the photosensitive drum 9 is performed by an exposure unit 15. The exposure unit 15 includes a light source that outputs the laser beam, a polygon mirror that scans with the laser beam by reflecting the laser beam, and a mirror and lens for guiding the laser beam to the surface of the photosensitive drum 9. In the image forming apparatus 1, a toner image is formed on the photosensitive drum 9 by the electrostatic latent image formed on the photosensitive drum 9 being developed using toner by the developer.

The transfer roller 10 is disposed in a position opposite the photosensitive drum 9, and forms the transfer nip portion with the photosensitive drum 9. By being applied with a predetermined voltage, the transfer roller 10 transfers the toner image on the photosensitive drum 9 onto the sheet conveyed to the transfer nip portion. The sheet onto which the toner image has been formed is then conveyed to a fixing unit 11. The fixing unit 11 fixes the toner image to the conveyed sheet by applying heat and pressure to the sheet. The sheet which has been subjected to fixing processing by the fixing unit 11 is discharged to a discharge tray 7, or is discharged to the post-processing apparatus 4. In a case where the sheet is discharged to the post-processing apparatus 4, the sheet is conveyed through a conveyance path 30 by a conveyance roller 23 and is passed to the post-processing apparatus 4. The conveyance roller 23 is driven by a motor (not shown). The conveyance path 30 corresponds to a part of the conveyance path, within the image forming apparatus 1, provided horizontally with respect to an installation surface of the image forming apparatus 1, downstream from the fixing unit 11 in the conveyance direction of the sheet.

The post-processing apparatus 4 includes an upstream roller 21, an entrance sensor 27, a punch unit 62, and a downstream roller 22, in that order from the upstream side along a conveyance path 40 for conveying the sheet discharged from the image forming apparatus 1. The entrance sensor 27 and the punch unit 62 can be disposed between the upstream roller 21 and the downstream roller 22. The punch unit 62 is configured as a rotary punch unit. The upstream roller 21 is driven by driving force transmitted via a gear from a conveyance motor 104. The downstream roller 22 is driven by driving force transmitted via a belt from the upstream roller 21.

The sheet discharged from the image forming apparatus 1 through the conveyance path 30 is conveyed along the conveyance path 40 within the post-processing apparatus 4 by the upstream roller 21 and the downstream roller 22. The post-processing apparatus 4 detects a leading end of the sheet using the entrance sensor 27, and causes the punch unit 62 to perform punching operations by rotationally driving the punch unit 62 after a predetermined period of time from the detection. The punching processing for punching a hole (forming a punch hole) in the sheet while conveying the sheet along the conveyance path 40 is performed in this manner. The sheet subjected to the punching processing is conveyed along the conveyance path 40 by the downstream roller 22, and is ejected (discharged) to a discharge tray 25 by a discharge roller 24.

<Functions of Image Forming Apparatus>

Figure 2:
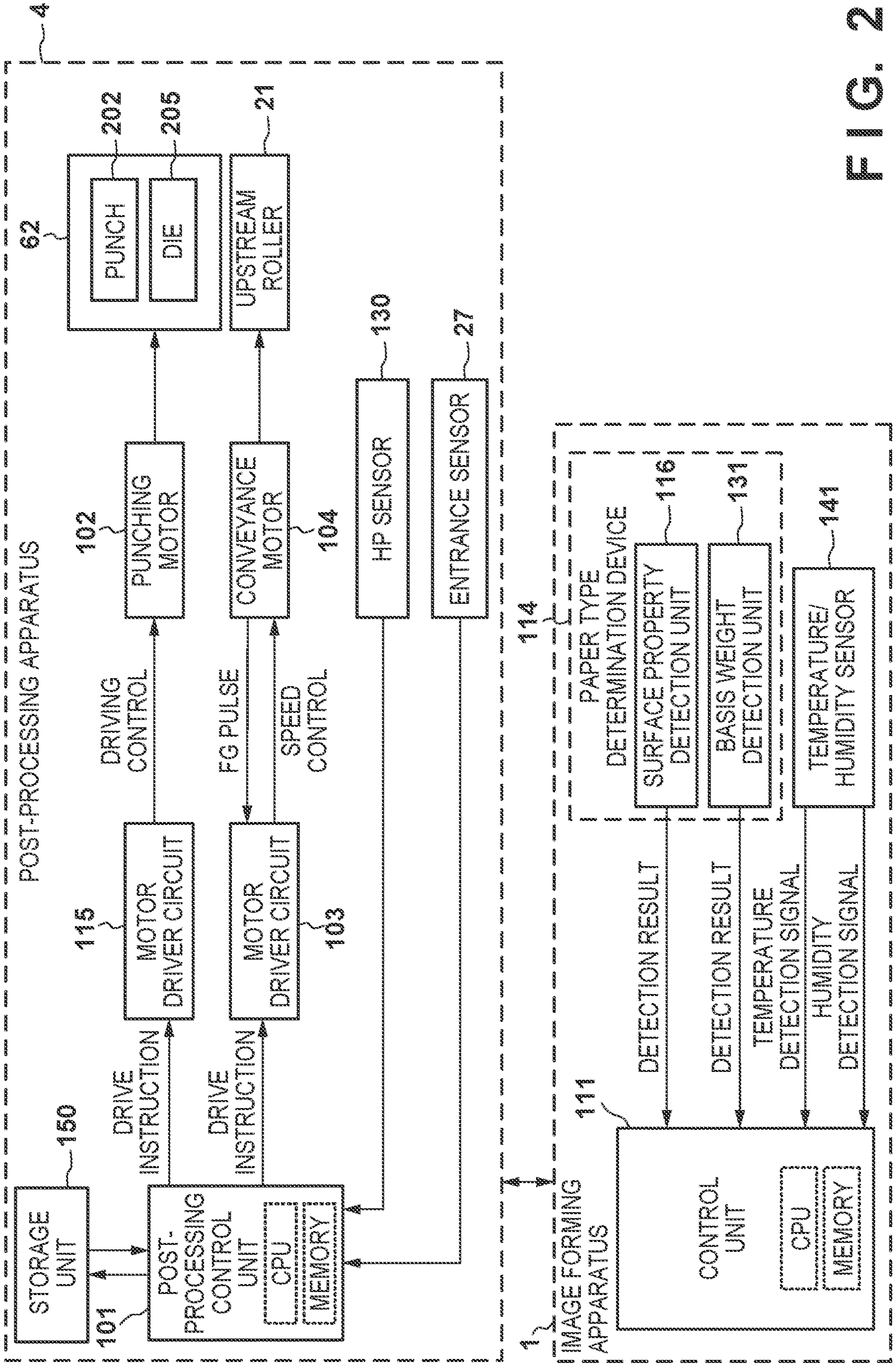
FIG. 2 is a block diagram illustrating an example of the functional configuration of the image forming system.

FIG. 2 is a block diagram illustrating an example of the functional configurations of the image forming apparatus 1 and the post-processing apparatus 4 constituting the image forming system 5. Note that FIG. 2 illustrates configurations related to control explained in the present embodiment (configurations related to determining the type of the sheet in the image forming apparatus 1 and configurations related to the conveyance of and punching processing on the sheet in the post-processing apparatus 4). Additionally, in the configuration example illustrated in FIG. 2, a temperature/humidity sensor 141 and a storage unit 150 are provided in the image forming system 5 according to a second embodiment, but these elements need not be provided in the image forming system 5 according to the first embodiment.

The image forming apparatus 1 includes a control unit 111 that controls image forming operations performed by the image forming apparatus 1. The control unit 111 performs conveyance control on sheets in the conveyance path 30 of the image forming apparatus 1 and the conveyance path 40 of the post-processing apparatus 4, and image forming control based on a detection result from the paper type determination device 114. The control unit 111 may be configured to include at least one CPU and at least one memory. In this case, the processing by the control unit 111 (described later) can be implemented by processing in which the CPU reads out a control program stored in the memory and executes that program. Alternatively, the control unit 111 may be constituted by dedicated circuitry such as an ASIC or the like (a hardware module).

The paper type determination device 114 includes a surface property detection unit 116 and a basis weight detection unit 131. In the present embodiment, the surface property detection unit 116 is an example of a detection unit that detects a surface property of a sheet conveyed along a conveyance path toward the punch unit 62. The basis weight detection unit 131 is an example of a basis weight detection unit that detects a basis weight of the sheet conveyed along a conveyance path toward the punch unit 62.

The surface property detection unit 116 outputs, to the control unit 111, a reflected light amount obtained when irradiating the sheet with light, as a detection result. The control unit 111 identifies a surface property of the sheet based on the detection result output from the surface property detection unit 116. In the present embodiment, the control unit 111 identifies the surface property of the sheet based on whether the reflected light amount indicated by the detection result falls within a range corresponding to “rough paper”, “plain paper”, or “glossy paper”.

The basis weight detection unit 131 outputs, to the control unit 111, a transmitted light amount obtained when irradiating the sheet with light, as a detection result. The control unit 111 determines (identifies) the basis weight of the sheet based on the detection result output from the basis weight detection unit 131. In the present embodiment, the control unit 111 identifies the basis weight (basis weight range) of the sheet based on whether the transmitted light amount indicated by the detection result falls within a range corresponding to “heavy”, “normal”, or “light”.

<Functions of Post-Processing Apparatus>

The post-processing apparatus 4 includes a post-processing control unit 101 that controls the punching operations and sheet conveyance operations by the post-processing apparatus 4. The post-processing control unit 101 can control the punching operations and the sheet conveyance operations based on information output from the control unit 111 (e.g., paper type information, print job information, and temperature/humidity information). Note that a print job can include settings pertaining to the punching processing (punch designation). The post-processing control unit 101 may be configured to include at least one CPU and at least one memory. In this case, the processing by the post-processing control unit 101 (described later) can be implemented by processing in which the CPU reads out a control program stored in the memory and executes that program. Alternatively, the post-processing control unit 101 may be constituted by dedicated circuitry such as an ASIC or the like (a hardware module).

The post-processing control unit 101 controls the driving of a punching motor 102 and the conveyance motor 104 to control the punching operations and the sheet conveyance operations. A motor driver circuit 115 drives the punching motor 102 according to drive instructions from the post-processing control unit 101. The punching motor 102 is configured to rotationally drive the punch unit 62 (a punch 202 and a die 205). The punch unit 62 is an example of a punch unit including a punch member (the punch 202) that, while rotating, performs punching processing on a sheet conveyed from the image forming apparatus 1.

The motor driver circuit 115 rotates the punch unit 62 (the punch 202 and the die 205) by driving the punching motor 102. A motor driver circuit 103 drives the conveyance motor 104 according to drive instructions from the post-processing control unit 101. The conveyance motor 104 is configured to rotationally drive the upstream roller 21. The motor driver circuit 103 rotates the upstream roller 21 by driving the conveyance motor 104.

In the present embodiment, the punching motor 102 can be constituted by a stepping motor. The conveyance motor 104 can be constituted by a DC brushless motor. The DC brushless motor includes a Hall element as a sensor for detecting the position (phase) of the rotor, and the Hall element outputs FG pulses at a period proportional to the number of rotations of the rotor. The motor driver circuit 103 controls the rotation speed of the conveyance motor 104 based on the FG pulses output from the conveyance motor 104.

The post-processing control unit 101 further detects whether or not a sheet is present based on a signal output from the entrance sensor 27, and detects a rotational position of the punch 202 (the punch member) based on a signal output from a home position (HP) sensor 130. The HP sensor 130 includes a photointerrupter and a flag member (not shown), and is configured to output different signals depending on whether or not light traveling from a light emitting unit of the photointerrupter to a light receiving unit of the photointerrupter is blocked by the flag member. Specifically, the HP sensor 130 outputs either a signal indicating a light-blocking state (a detection state) or a signal indicating a light-transmitting state (a non-detection state). As will be described later, the HP sensor 130 is configured to output the signal indicating the light-blocking state when the rotational position of the punch 202 is within a predetermined range. In other words, the HP sensor 130 alternately outputs the signal indicating the light-blocking state and the signal indicating the light-transmitting state for each rotational period of the punch 202 (outputs a pulse signal having a period corresponding to the rotational period).

<Hole Punching Section of Punch Unit>

FIGS. 3A to 3D are cross-sectional views illustrating an example of operations of the punch unit 62. The punch unit 62 has a configuration in which a support shaft 65 of the punch 202 and a support shaft 66 of the die 205 are both supported by a casing (not shown) in a rotatable state. Gears (not shown) each fixed to one end of the support shafts 65 and 66 of the punch 202 and the die 205, respectively, mesh with a gear provided on an output shaft of the punching motor 102. The punch 202 is configured to rotate about the support shaft 65, in what is the clockwise direction in FIGS. 3A to 3D, with the rotation of the punching motor 102. The die 205 is configured to rotate in what is the counterclockwise direction in FIGS. 3A to 3D in synchronization with the rotation of the punch 202.

The die 205 includes a die hole 206 provided in a position corresponding to the punch 202. FIGS. 3A to 3D illustrate how the rotational positions of the punch 202 and the die 205 change (are positioned), and illustrate how the position of the punch 202 and the position of the die hole 206 change over time such that a hole is punched in the sheet by the punch 202. FIG. 3C illustrates the punch 202 in a position of fitting into the die hole 206 (a punching center position 75). The punch unit 62 is configured to punch a hole in the sheet using the punch 202 by the punch 202 fitting into the die hole 206 while the sheet is passing through the punching center position 75.

Figure 3A:
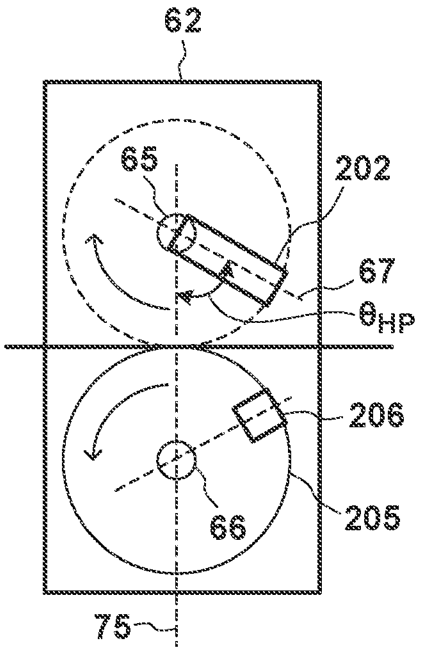
FIGS. 3A to 3D are cross-sectional views illustrating an example of operations of a punch unit.

FIG. 3A illustrates the punch 202 at a standby position 67, which corresponds to the home position (HP). The standby position 67 is defined as a position an angle $\theta_{HP}$ in front of the punching center position 75 in the rotation direction of the punch 202. Normally, the post-processing control unit 101 stops the punch 202 at the standby position 67 when not performing punching operations using the punch 202. The angle $\theta_{HP}$ is defined such that the punch 202 stopped at the standby position 67 does not interfere with the conveyance of the sheet.

Figure 3B:
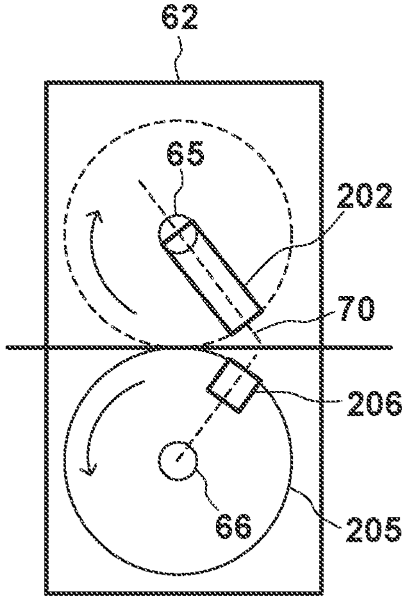
Figure 3C:
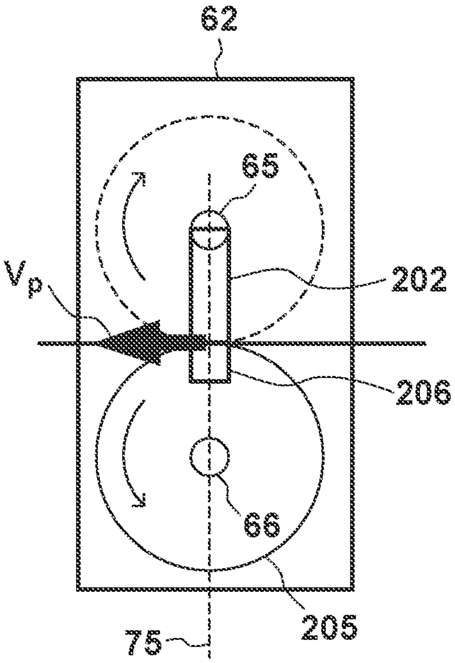
Figure 3D:
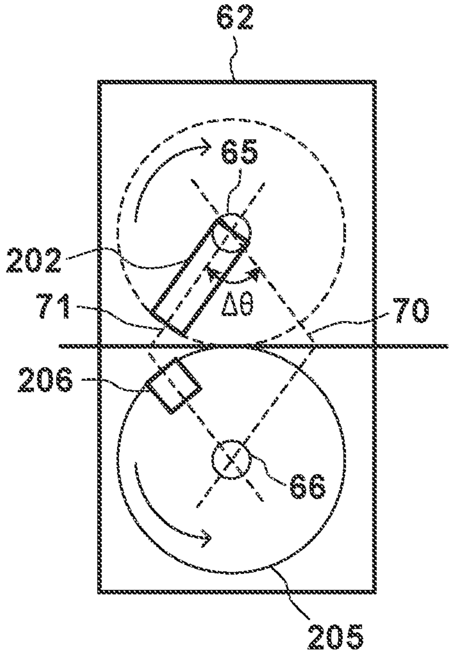

FIG. 3B illustrates the punch 202 at a position where the punch 202 begins punching a hole in the sheet (a punching start position 70). FIG. 3D illustrates the punch 202 at a position where the punch 202 begins separating from the sheet (finishes punching a hole) (a punching end position 71). The HP sensor 130 is configured to output the signal indicating the light-blocking state (the detection state) when the rotational position of the punch 202 is within the range of an angle $\Delta\theta$ from the punching start position 70 to the punching end position 71. The HP sensor 130 outputs the signal indicating the light-transmitting state (the non-detection state) when the rotational position of the punch 202 is in any other range.

The post-processing control unit 101 uses the motor driver circuit 115 to stop the punch 202 at the standby position 67 (HP) as will be described hereinafter. Specifically, the post-processing control unit 101 stops the driving of the punching motor 102 at a timing when the punching motor 102 has been driven by a predetermined number of steps after the output of the HP sensor 130 switches from the light-blocking state to the light-transmitting state. As a result, the punch 202 rotates from the punching end position 71 illustrated in FIG. 3D to the standby position 67 illustrated in FIG. 3A and then stops.

<Sheet Conveyance Control and Punching Control in Post-Processing Apparatus>

Figure 4A:
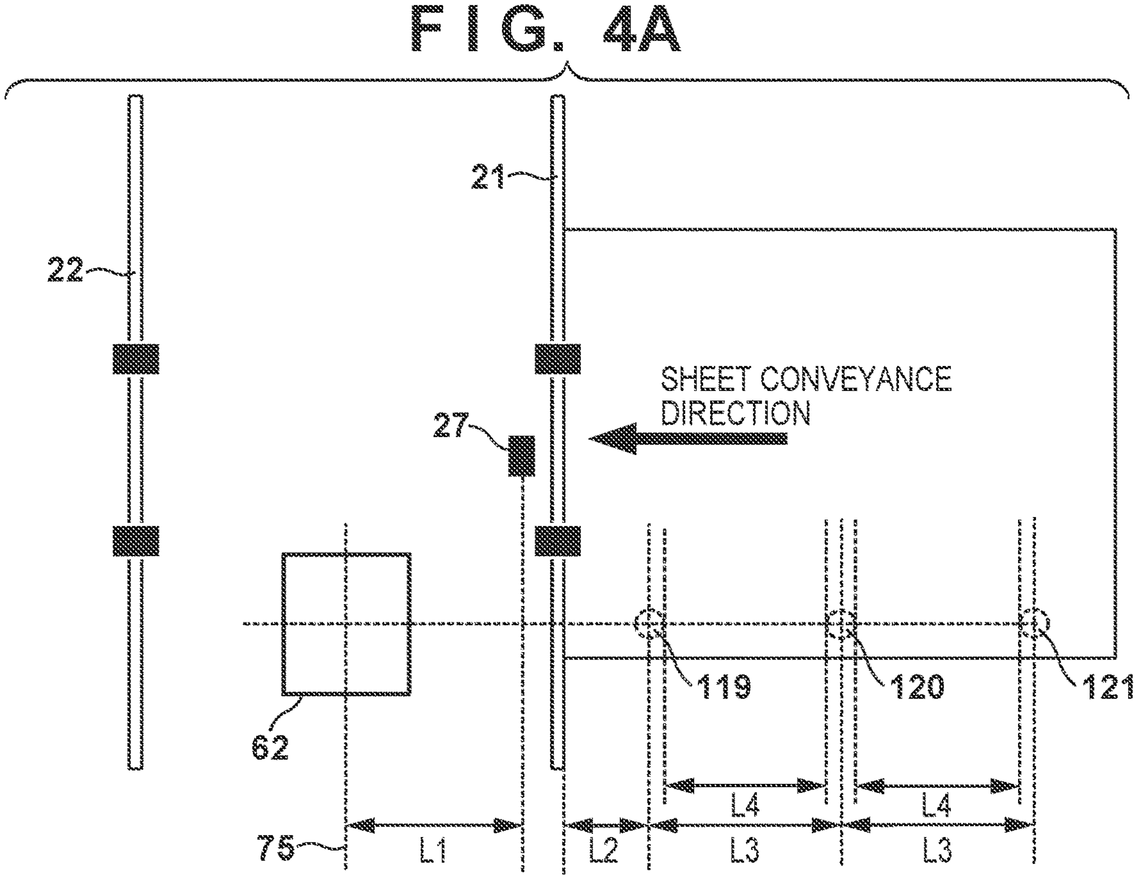
FIGS. 4A and 4B are plan views illustrating an example of the configuration of a post-processing apparatus.
Figure 4B:
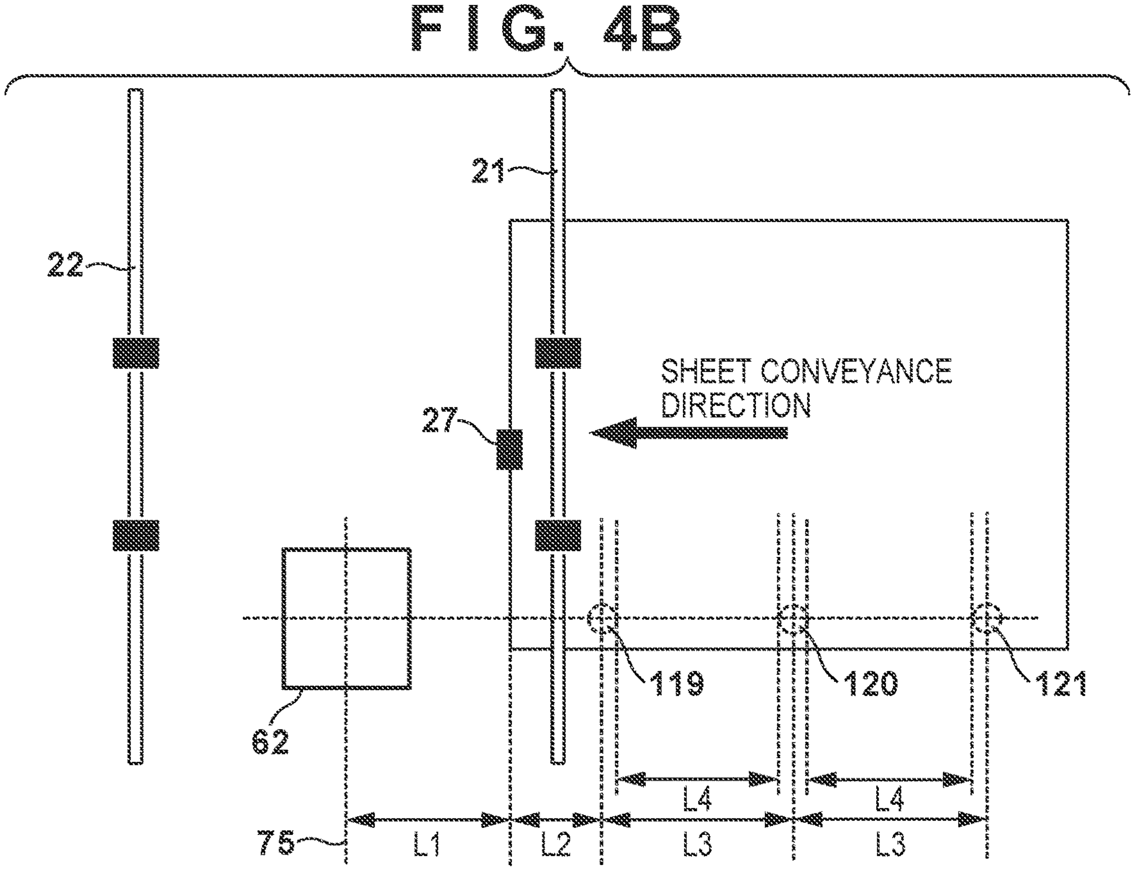

An example of sheet conveyance control and punching control in the post-processing apparatus 4 will be described next with reference to FIGS. 4A and 4B. FIGS. 4A and 4B are plan views illustrating an example of the configuration of the post-processing apparatus 4. FIG. 4A illustrates a state in which a leading end, in the sheet conveyance direction, of a sheet discharged from the image forming apparatus 1 has reached the upstream roller 21. FIG. 4B illustrates a state in which the sheet has reached a position where the sheet is detected by the entrance sensor 27 in the sheet conveyance direction.

In FIGS. 4A and 4B, positions 119, 120, and 121, which are ideal positions as the positions of the punch holes formed through the punching (punch hole positions) when forming three punch holes in a sheet using the punch unit 62, are indicated by broken line circles. $L_1$ to $L_4$ indicate the following respective distances (intervals) in the sheet conveyance direction.

- $L_1$: the distance from the punching center position 75 of the punch unit 62 to the position of the entrance sensor 27.
- $L_2$: the distance from the leading end of the sheet to the first punch hole position 119.
- $L_3$: the ideal interval of the punch hole positions 119 to 121.
- $L_4$: the distance between end parts of adjacently-formed punch holes.

The post-processing control unit 101 controls the rotation speed of the conveyance motor 104 using the motor driver circuit 103 in accordance with instructions from the control unit 111 (a print job including punch designation). The motor driver circuit 103 controls the rotation speed of the conveyance motor 104 by controlling drive current supplied to the conveyance motor 104 such that the period of the FG pulses output from the conveyance motor 104 becomes equal to a predetermined target period.

The sheet discharged from the image forming apparatus 1 by the conveyance roller 23 and supplied to the post-processing apparatus 4 reaches the upstream roller 21 as illustrated in FIG. 4A. The upstream roller 21 and the downstream roller 22 convey the sheet along the conveyance path 40 by rotating under the driving force of the conveyance motor 104. The sheet which has reached the upstream roller 21 is conveyed along the conveyance path 40 toward the punch unit 62 by the upstream roller 21. A sheet conveyance speed $V_s$ [mm/sec] by the upstream roller 21 and the downstream roller 22 can be obtained as follows, using a rotation speed $V_{smotor}$ [rpm] of the conveyance motor 104, a reduction ratio $K_s$ of the drive gears connecting the conveyance motor 104 and the upstream roller 21, and a radius $R_s$ of both the upstream roller 21 and the downstream roller 22.

$$V_s=R_s\times 2\pi V_{smotor}\times K_s \quad (1)$$

As described above, the post-processing control unit 101 causes the punch 202 to stand by at the standby position 67 (FIG. 3A) in advance before the punching operations by the punch unit 62 are started. As illustrated in FIG. 4B, when the leading end of the sheet reaches the position of the entrance sensor 27, the leading end of that sheet is detected by the entrance sensor 27. Once a predetermined wait time $T_{stop}$ passes after the timing at which the leading end of the sheet is detected by the entrance sensor 27, the post-processing control unit 101 starts driving the punching motor 102.

The post-processing control unit 101 controls the driving of the punching motor 102 using the motor driver circuit 115 such that the rotation speed of the punching motor 102 becomes equal to a predetermined target rotation speed (command speed) according to a predetermined speed profile. When the punch 202 reaches the punching center position 75 illustrated in FIG. 3C as a result of the driving of the punching motor 102, a punch hole is formed in the sheet by the punch 202 at the punch hole position 119. The target rotation speed (command speed) of the punching motor 102 is defined such that a speed $V_p$ in the tangential direction with respect to the rotational motion of the punch 202 and the die 205 indicated in FIG. 3C matches the sheet conveyance speed $V_s$.

The aforementioned wait time $T_{stop}$ is obtained using a time $T_s$ and a time $T_p$. The time $T_s$ is a time from when the leading end of the sheet is detected by the entrance sensor 27 to when the first punch hole position 119 on the sheet reaches the punching center position 75. The time $T_p$ is the time required for the punch 202 and the die 205 to rotate from the standby position 67 (FIG. 3A) to the punching center position 75 (FIG. 3C) in accordance with the predetermined speed profile. Assuming the sheet conveyance speed $V_s$ is constant, the time $T_s$ can be obtained as follows.

$$T_s=L(_1+L_2)/V_s \quad (2)$$

Furthermore, the wait time $T_{stop}$ can be obtained as follows.

$$T_{stop}=T_s-T_p \quad (3)$$

For example, if $L_1$=50 [mm], $L_2$=31.7 [mm], and $V_s$=400 [mm/sec], $T_s$=204 [msec] is obtained from Formula (2). Additionally, if $T_p$=50 [msec], a wait time $T_{stop}$=154 [msec] is obtained from Formula (3).

The wait time $T_{stop}$ depends on the number of punch holes formed in the sheet through the punching, and the size of the sheet in the sheet conveyance direction. The present embodiment will use an example in which three punch holes are formed in a “letter” size sheet.

In the examples in FIGS. 4A and 4B, the post-processing control unit 101 forms three punch holes at the positions 119 to 121 on a single sheet through the punching processing using the punch unit 62. When performing the punching processing multiple consecutive times on the single sheet in this manner, the post-processing control unit 101 drives the punching motor 102 according to the predetermined speed profile each time a single instance of the punching processing is complete. As a result, the post-processing control unit 101 rotationally drives the punch 202 from the punching end position 71 (FIG. 3D) to the punching start position 70 (FIG. 3B).

Meanwhile, when performing the punching processing multiple consecutive times on a plurality of sheets, the post-processing control unit 101 drives the punching motor 102 according to the predetermined speed profile and stops the punch 202 at the standby position 67 each time the punching processing is complete on a single sheet. Then, when the leading end of the next sheet is detected by the entrance sensor 27, the post-processing control unit 101 starts driving the punching motor 102 again after the wait time $T_{stop}$ passes and performs the punching processing on that sheet.

<Punch Hole Position Misalignment Caused by Slippage>

Misalignment of the punch hole positions on the sheet by the punch unit 62 caused by slippage when the sheet is conveyed by the conveyance rollers provided in the image forming system 5 (the upstream roller 21, the downstream roller 22, the conveyance roller 23, and the discharge roller 24) will be described next. Note that the following descriptions will assume that the diameters of respective conveyance rollers are the same and the set rotation speeds of the respective motors that drive respective conveyance rollers are the same.

The following two conditions (1) and (2) can be given as conditions under which it is highly likely for slippage to occur when a sheet is conveyed by the conveyance roller.

(1) When conveying a sheet having a smooth surface with a low coefficient of friction. In this case, the smoother the surface of the sheet to be conveyed is, the more likely it is for slippage to occur during the conveyance by the conveyance roller.

(2) When a difference arises between the sheet conveyance speed and the surface speed of the conveyance roller. In particular, when the set rotation speed of the conveyance roller is high, a difference can arise between the sheet conveyance speed and the surface speed of the conveyance roller due to fluctuations in the load on the conveyance roller.

Fluctuations in the load on the conveyance roller occur, for example, when the leading end of a sheet reaches the upstream roller 21, the downstream roller 22, and the discharge roller 24, or when the trailing end of the sheet moves away from the upstream roller 21 and the conveyance roller 23. For example, when the rotation speed of the conveyance motor 104 fluctuates due to a fluctuation in the load on the upstream roller 21, the motor driver circuit 103 performs speed control to bring the rotation speed of the conveyance motor 104 closer to the set rotation speed. The motor driver circuit 103 controls the rotation speed of the conveyance motor 104 by adjusting the drive current supplied to that motor through feedback control based on the FG pulses output from the conveyance motor 104. However, if the set rotation speed of the conveyance motor 104 is high, delay can arise in the feedback control by the motor driver circuit 103, resulting in a difference between the sheet conveyance speed and the surface speed of the conveyance roller.

The post-processing control unit 101 performs the punching processing using the punch unit 62 by driving the punching motor 102 according to the predetermined speed profile. When a difference arises between the sheet conveyance speed and the surface speed of the conveyance roller as described above, error with respect to the ideal interval (e.g., $L_3$ in FIGS. 4A and 4B) arises in the intervals between the punch holes formed in the sheet through the punching processing using the punch unit 62. In other words, misalignment arises in the punch hole positions on the sheet at which punch holes are formed by the punch unit 62. Such error arises during a slip period in which slippage arises in the conveyance roller and the sheet therefore cannot be conveyed at the desired conveyance speed.

Increasing the nip pressure (conveyance force) of a conveyance roller can be given as one method for suppressing slippage in the conveyance roller when conveying a sheet. However, doing so can lead to faster wear on the conveyance roller, causing creeping deformation in the components that hold the conveyance roller. Accordingly, in the present embodiment, misalignment in the punch hole positions caused by slippage of the conveyance roller is suppressed by appropriately controlling the sheet conveyance speed as described below.

<Conveyance Control Based on Sheet Surface Properties>

The image forming system 5 (the image forming apparatus 1 and the post-processing apparatus 4) of the present embodiment perform sheet conveyance control such that the sheet to be processed is conveyed, in the conveyance paths 30 and 40 within the apparatuses, at a conveyance speed corresponding to the surface property of that sheet. Misalignment in the punch hole positions caused by slippage in the conveyance roller is suppressed as a result.

Figures 5, 6:
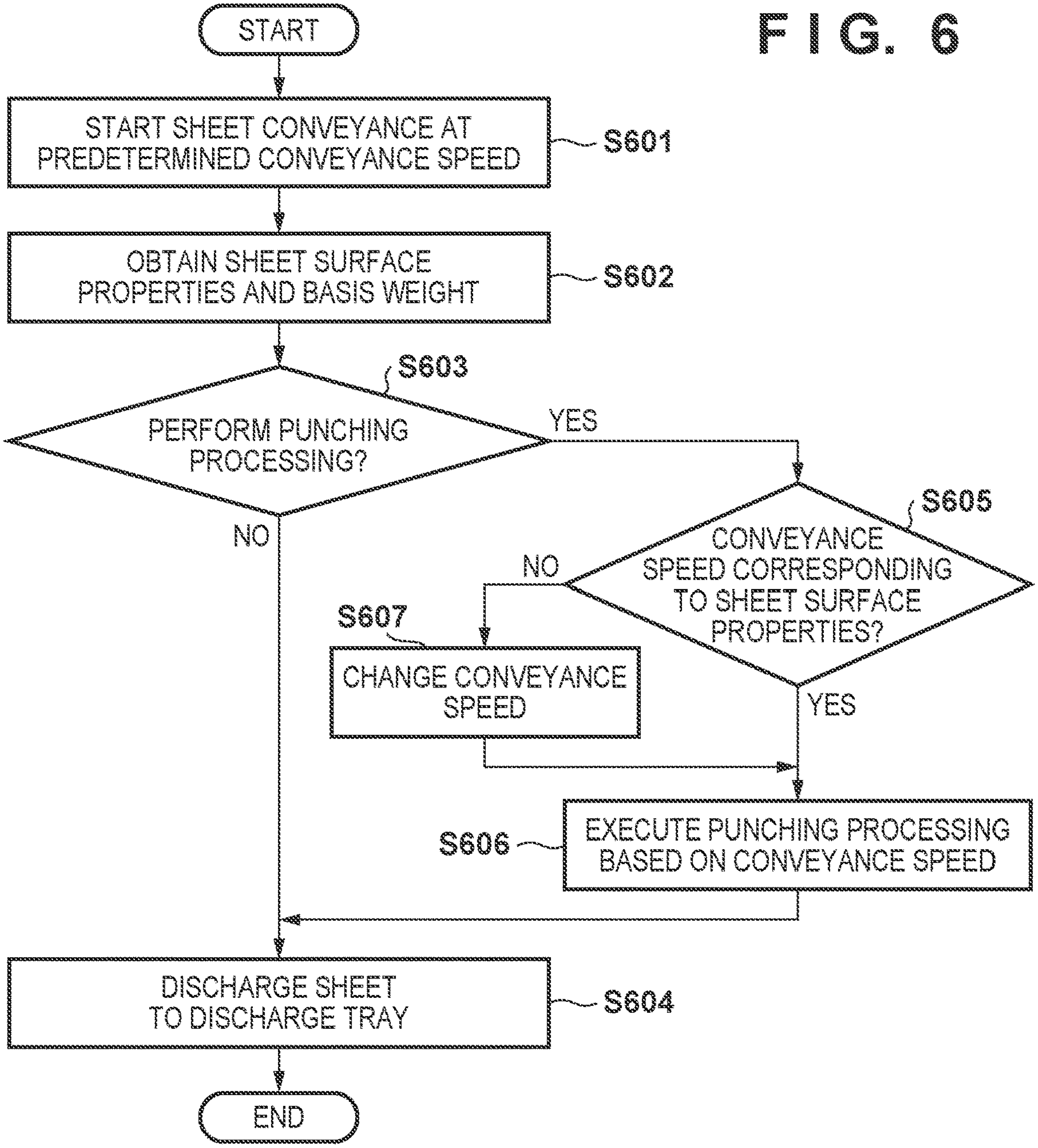
FIG. 5 illustrates an example of a settings table for a sheet conveyance speed and a rotation speed of a punching motor.
FIG. 6 is a flowchart illustrating a processing sequence for sheet conveyance control and punching control.

To implement such conveyance control, in the present embodiment, a plurality of sheet conveyance speeds corresponding to a plurality of respective sheet types are prepared, and a rotation speed of the punching motor 102 corresponding to each of the sheet conveyance speeds is prepared as well. FIG. 5 illustrates an example of a settings table for sheet conveyance speeds and rotation speeds of the punching motor 102, which are associated with a plurality of types (surface properties) of sheets. Note that the rotation speed of the punching motor 102 corresponds to the rotation speed $V_p$ of the punch 202 and the die 205 at the punching center position 75.

The image forming system 5 (the image forming apparatus 1 and the post-processing apparatus 4) of the present embodiment set the sheet conveyance speed and the rotation speed of the punching motor 102 as indicated in FIG. 5, based on a surface property of a sheet to be processed. In the example in FIG. 5, in a case where the surface property of the sheet to be processed correspond to “plain paper”, the sheet conveyance speed is set to 400 [mm/sec], and the rotation speed of the punching motor 102 is set to 1000 [pps]. In a case where the surface property of the sheet to be processed correspond to “glossy paper”, the sheet conveyance speed is set to 100 [mm/sec], and the rotation speed of the punching motor 102 is set to 250 [pps].

When the punching processing by the post-processing apparatus 4 is performed on a conveyed sheet, the image forming system 5 performs sheet conveyance control such that the sheet is conveyed at the set conveyance speed. Furthermore, the image forming system 5 controls the driving of the punching motor 102 such that (the rotor of) the punching motor 102 is rotated at the set rotation speed. When performing the punching processing consecutively on a plurality of sheets, the image forming system 5 may rotate the punch 202 from the punching end position 71 to the punching start position 70 by driving the punching motor 102 according to the speed profile corresponding to the sheet conveyance speed.

In this manner, slippage can be prevented from occurring in the conveyance roller by the post-processing apparatus 4 performing the punching processing while the sheet is conveyed at a conveyance speed which matches the type (surface property) of the sheet to be processed. This makes it possible to prevent misalignment in the punch hole positions on the sheet caused by slippage in the conveyance roller. Additionally, conveying the sheet at a conveyance speed which matches the type (surface property) of the sheet to be processed makes it possible to reduce delay arising in the feedback control of the conveyance motor 104 caused by fluctuations in the load on the conveyance roller. Accordingly, the effect of conveyance roller slippage on the punching processing can be reduced even when conveying a sheet having a smooth surface, such as glossy paper, which can lead to the suppression of misalignment in the punch hole positions on the sheet.

Meanwhile, the aforementioned punch hole position misalignment occurs when the sheet conveyance speed differs from the conveyance speed corresponding to the type of the sheet to be processed. When the type and size of the sheet are not specified in the print job to be executed, the image forming system 5 may convey the sheet at a predetermined conveyance speed in the conveyance paths 30 and 40. For example, assume a case where the sheet actually conveyed is "glossy paper" but the sheet is conveyed at a conveyance speed corresponding to "plain paper" (400 [mm/sec], in the example in FIG. 5). In this case, the sheet having a smooth surface will be conveyed at a conveyance speed higher than the conveyance speed corresponding to the surface property of that sheet, which increases the likelihood of conveyance roller slippage occurring when the sheet is conveyed. When conveyance roller slippage occurs, misalignment in the punch hole positions on the sheet at which punch holes are formed by the punch unit 62 arises, which causes error in the intervals of the punch holes formed in the sheet (error from the ideal intervals).

Accordingly, the image forming system 5 of the present embodiment detects the surface property of the sheet using the paper type determination device 114 while the sheet is being conveyed, and based on the detected surface property, controls the conveyance speed of the sheet and performs the punching processing on the sheet. For example, in a case where a sheet is being conveyed at a conveyance speed different from the conveyance speed corresponding to the surface property of the sheet to be processed, the image forming system 5 changes the conveyance speed to the conveyance speed corresponding to the surface property of the sheet and performs the punching processing.

As one example, assume a case where the conveyance of a sheet is started at the conveyance speed corresponding to "plain paper" (e.g., 400 [mm/sec]), and it is then detected, using the paper type determination device 114, that the surface property of the sheet correspond to "glossy paper". In this case, in the conveyance path 30, the conveyance speed of the sheet is reduced to the conveyance speed corresponding to "glossy paper" (e.g., 100 [mm/sec]). On the other hand, assume a case where the conveyance of a sheet is started at the conveyance speed corresponding to "glossy paper" (e.g., 100 [mm/sec]), and it is then detected, using the paper type determination device 114, that the surface property of the sheet correspond to "plain paper". In this case, in the conveyance path 30, the conveyance speed of the sheet is increased to the conveyance speed corresponding to "plain paper" (e.g., 400 [mm/sec]).

Note that in the image forming system 5 of the present embodiment, the control unit 111 (the post-processing control unit 101) drives the punching motor 102 according to a speed profile corresponding to the conveyance speed of the sheet during conveyance, using as a reference the timing at which the leading end of the sheet is detected by the entrance sensor 27. This causes the punch unit 62 (the punch 202) to perform the punching processing on the sheet. As such, it may be necessary to complete the change in the sheet conveyance speed described above by the time the leading end of the sheet during conveyance reaches the entrance sensor 27 (the leading end of the sheet is detected by the entrance sensor 27).

In this manner, in the present embodiment, as illustrated in FIG. 5, the conveyance speed corresponding to the surface property of the sheet is defined in advance for each of a plurality of types of sheets each having a different surface property. Additionally, the conveyance speed corresponding to the surface property of the sheet is defined in advance as a conveyance speed at which slippage does not occur between the conveyance roller and the sheet when the conveyance roller conveys the sheet in the conveyance path.

<Punching Control Based on Basis Weight of Sheet>

In the punching processing using the punch unit 62, if the punch 202 and the die 205 are overloaded during the punching operations, the operation (rotation) of the punch 202 may stop with the teeth of the punch 202 remaining in the sheet. If the sheet is conveyed in such a state, a paper jam may occur in the post-processing apparatus 4.

If the punching operations are continued in a state where the punch 202 and the die 205 are overloaded, the distance and inclination relationships between the support shaft 65 of the punch 202 and the support shaft 66 of the die 205 may change, resulting in a change in the intermeshing of the punch 202 and the die 205. If the intermeshing of the punch 202 and the die 205 changes in this manner, burrs will arise at the locations where holes are punched in the sheet, causing a drop in the quality of the punch holes formed by the punching operations. It also may become impossible to form punch holes even in sheets having a low basis weight (e.g., sheets having a basis weight corresponding to "light").

Accordingly, the image forming system 5 may perform punching control such that the punching processing is not performed on a sheet in a case where a condition under which the punch unit 62 (the punch 202 and the die 205) is overloaded is satisfied. This prevents the punch unit 62 from being overloaded, which in turn prevents problems from arising in the intermeshing of the punch 202 and the die 205.

One condition under which the punch 202 and the die 205 are overloaded to the extent that the intermeshing of the punch 202 and the die 205 changes is that a sheet having a high basis weight is subjected to the punching processing. As the basis weight of the sheet to be processed increases, the load on the punch 202 and the die 205 during punching operations increases.

Accordingly, the image forming system 5 of the present embodiment skips the punching processing on a sheet to be processed in a case where, based on the basis weight or the type of the sheet, a condition under which the punch unit 62 is overloaded is satisfied. For example, the image forming system 5 detects the basis weight of the sheet to be processed, and determines whether or not to perform punching operations using the punch unit 62 based on the detected basis weight. The image forming system 5 further controls the operations of the punch unit 62 according to the result of the determination. The basis weight of the sheet can be detected using the paper type determination device 114 (the basis weight detection unit 131).

The image forming system 5 skips the punching operations by the punch unit 62 in a case where the detection result for the basis weight of the sheet indicates that the punch unit 62 is to be overloaded. For example, the punching operations by the punch unit 62 are skipped in a case where the output from the basis weight detection unit 131 indicates a basis weight within a basis weight range corresponding to "heavy". On the other hand, the punching operations by the punch unit 62 are performed in a case where the output from the basis weight detection unit 131 indicates a basis weight within a basis weight range corresponding to "light" or "normal". In the present embodiment, performing such control prevents changes in the intermeshing of the punch 202 and the die 205, which in turn prevents a drop in the quality of the punch holes formed through the punching operations.

<Processing Sequence>

FIG. 6 is a flowchart illustrating a processing sequence for sheet conveyance control and punching control executed in the image forming system 5 of the present embodiment. The processing of each step in FIG. 6 is executed by the control unit 111 or the post-processing control unit 101 in the image forming system 5. The control unit 111 executes the processing according to the sequence illustrated in FIG. 6 when the execution of a job including punching processing by the post-processing apparatus 4 is started.

In step S601, the control unit 111 feeds a sheet from the paper feed device 6 to the conveyance path, and starts conveying the sheet at a predetermined conveyance speed. If the type of paper is not specified in the job, the conveyance of the sheet is started at the predetermined conveyance speed corresponding to "plain paper", for example, as described above. However, if the type of paper is specified in the job, the conveyance of the sheet may be started at the conveyance speed corresponding to the specified type of paper.

Next, in step S602, using the paper type determination device 114, the control unit 111 obtains the surface property and the basis weight of the sheet being conveyed. As described above, the paper type determination device 114 outputs, to the control unit 111, a detection result for the surface property and a detection result for the basis weight of the sheet in the conveyance path. Based on the output from the paper type determination device 114, the control unit 111 obtains the surface property and the basis weight of the sheet being conveyed.

In step S603, the control unit 111 determines whether or not to perform punching processing on the sheet being conveyed based on the basis weight of the sheet. In this example, the control unit 111 makes the determination based on whether or not the basis weight of the sheet is within a range corresponding to "heavy". The range corresponding to "heavy" is defined as a basis weight range greater than a predetermined basis weight threshold. For example, the punching processing is determined to be skipped in a case where the basis weight of the sheet is greater than the predetermined basis weight threshold, whereas the punching processing is determined to be performed in a case where the basis weight of the sheet is less than or equal to the predetermined basis weight threshold. In this manner, the control unit 111 controls whether or not to perform the punching processing on the sheet being conveyed based on the basis weight of the sheet, detected by the paper type determination device 114 (the basis weight detection unit 131).

If the punching processing is determined to be skipped, the control unit 111 moves the sequence to step S604. In this case, the control unit 111 instructs the post-processing control unit 101 to discharge the sheet being conveyed without performing the punching processing on the sheet. In step S604, the post-processing control unit 101 discharges the sheet on which an image has been formed by the image forming apparatus 1, and which has been conveyed through the conveyance paths 30 and 40, to the discharge tray 25 without performing the punching processing on the sheet, and then ends the processing of the sequence illustrated in FIG. 6. In this manner, in a case where the basis weight of a sheet being conveyed is greater than the basis weight threshold, the control unit 111 (the post-processing control unit 101) controls the post-processing apparatus 4 to discharge the sheet without performing the punching processing on the sheet. Note that the basis weight threshold is set in advance as a condition under which the punch unit 62 is overloaded in the punching processing. Controlling whether or not to perform the punching processing using such a basis weight threshold makes it possible to prevent the punch unit from being overloaded in the punching processing.

On the other hand, if the punching processing is determined to be performed, the control unit 111 moves the sequence from step S603 to step S605. In step S605, the control unit 111 determines whether or not the conveyance speed of the sheet being conveyed is the conveyance speed corresponding to the detected surface property. The control unit 111 moves the sequence to step S606 if the conveyance speed of the sheet being conveyed is the conveyance speed corresponding to the detected surface property, and moves the sequence to step S607 if the conveyance speed of the sheet being conveyed is not the conveyance speed corresponding to the detected surface property. In step S607, the control unit 111 changes the conveyance speed of the sheet in the conveyance path 30 to the conveyance speed corresponding to the surface property of the sheet, and then moves the sequence to step S606. In this manner, the control unit 111 controls the conveyance of the sheet such that the sheet is conveyed to the punch unit 62 at the conveyance speed corresponding to the surface property detected by the surface property detection unit 116.

If the sequence has moved to step S606, the control unit 111 controls the rotation of the punch 202 such that the punching processing is performed on the sheet conveyed from the image forming apparatus 1 while the punch 202 (the punch member) rotates at a rotation speed corresponding to the conveyance speed. Specifically, the control unit 111 instructs the post-processing control unit 101 to perform, based on the sheet conveyance speed, sheet conveyance control using the conveyance motor 104 and punching control using the punching motor 102.

In step S606, the post-processing control unit 101 performs the punching processing on the sheet based on the conveyance speed of the sheet. Specifically, the post-processing control unit 101 performs the punching processing on the sheet by driving the punching motor 102 at a rotation speed corresponding to the sheet conveyance speed. Then, the post-processing control unit 101 moves the sequence to step S604, discharges the sheet subjected to the punching processing to the discharge tray 25, and ends the processing of the sequence illustrated in FIG. 6.

Note that the image forming system 5 can be configured such that at least some of the processing executed by the control unit 111 in the sequence illustrated in FIG. 6 is executed by the post-processing control unit 101.

As described thus far, the image forming system 5 of the present embodiment includes the punch unit 62 provided in the post-processing apparatus 4, the surface property detection unit 116 that detects the surface property of the sheet conveyed along the conveyance path toward the punch unit 62, and the control unit 111. The punch unit 62 includes the punch 202 (a punch member) that, while rotating, performs punching processing on the sheet conveyed from the image forming apparatus 1. The control unit 111 controls the conveyance of the sheet such that the sheet is conveyed to the punch unit 62 at a conveyance speed corresponding to the surface property detected by the surface property detection unit 116. For example, if the conveyance speed of the sheet being conveyed in the conveyance path is not the conveyance speed corresponding to the surface property detected by the surface property detection unit 116, the control unit 111 (or the post-processing control unit 101) changes the conveyance speed of the sheet to the conveyance speed corresponding to the surface property. Furthermore, the control unit 111 (or the post-processing control unit 101) controls the rotation of the punch 202 such that the punching processing is performed on the sheet conveyed from the image forming apparatus 1 while the punch 202 rotates at a rotation speed corresponding to the conveyance speed.

According to the present embodiment, it is possible to prevent slippage between a conveyance roller and the sheet from occurring when the conveyance roller conveys the sheet in a conveyance path (or to reduce the possibility that such slippage occurs). This makes it possible to prevent misalignment in the punch hole positions on the sheet from being caused by slippage in the conveyance roller. In other words, error in the intervals of the punch holes formed in the sheet (error from the ideal intervals) can be prevented from arising. As such, according to the image forming system 5 of the present embodiment, punching processing can be performed at an appropriate position in a conveyed sheet regardless of the surface property of the sheet.

Additionally, in the image forming system 5 of the present embodiment, the control unit 111 (or the post-processing control unit 101) determines whether or not to perform punching processing on a sheet based on the basis weight of the sheet detected by the basis weight detection unit 131. Specifically, if the detected basis weight is greater than a basis weight threshold, the control unit 111 (the post-processing control unit 101) controls the post-processing apparatus 4 to discharge the sheet without performing the punching processing on the sheet.

According to the present embodiment, in the image forming system 5, the punch unit 62 can be prevented from being overloaded during the punching processing. This makes it possible to prevent problems from arising in the punch unit 62 due to overloading, which in turn makes it possible to prevent a drop in the quality of the punch holes formed by the punching processing due to problems in the punch unit 62.

Although the punching motor 102 is constituted by a stepping motor and the conveyance motor 104 is constituted by a DC brushless motor in the present embodiment, it should be noted that other types of motors may be used for the punching motor 102 and the conveyance motor 104. For example, the conveyance motor 104 may also be constituted by a stepping motor. Alternatively, the punching motor 102 may be constituted by a DC brushless motor. In this case, an encoder may be used to detect the phase of the rotor such that the rotation of the punch 202 and the die 205 can be controlled more accurately.

Additionally, although the paper type determination device 114 is disposed in the conveyance path between the paper feed device 6 and the transfer roller 10 in the present embodiment as illustrated in FIG. 1, the paper type determination device 114 may be disposed downstream from the transfer roller 10 in the sheet conveyance direction. In this case, the paper type determination device 114 can be disposed at a position before the upstream roller 21, such that the change in the sheet conveyance speed based on the detection result for the sheet surface property by the paper type determination device 114 (step S607) can be completed before the leading end of the sheet reaches the upstream roller 21. Additionally, although the sheet conveyance speed is changed as necessary in the conveyance path 30 within the image forming apparatus 1 based on the detection result for the surface property of the sheet being conveyed in the present embodiment, the sheet conveyance speed may be changed at a different timing or at a different position. For example, conveyance control may be performed such that immediately after the sheet surface property and basis weight are detected (the type of the sheet is determined) by the paper type determination device 114, the sheet conveyance speed is changed based on those detection results.

Second Embodiment

A second embodiment will describe an example in which whether or not to perform the punching processing on the sheet is further determined using a temperature and humidity (an absolute moisture content) in the installation environment of the image forming system 5 and a total number of punches made by the punch unit 62, in addition to the detection result for the basis weight of the sheet. Descriptions of parts identical to those in the first embodiment will be omitted in the following.

<Functions of Post-Processing Apparatus>

The temperature/humidity sensor 141 illustrated in FIG. 2 is a sensor used to measure a temperature and humidity in the installation environment of the image forming system 5 (the image forming apparatus 1 and the post-processing apparatus 4). The temperature/humidity sensor 141 includes an element that detects the temperature and outputs a temperature detection signal, and an element that detects the humidity and outputs a humidity detection signal. The control unit 111 receives the temperature detection signal and the humidity detection signal output from the temperature/humidity sensor 141. The control unit 111 obtains a saturated water vapor amount based on the temperature detection signal, and obtains the absolute moisture content in the air based on the saturated water vapor amount and a relative humidity obtained from the humidity detection signal. The control unit 111 can ascertain the moisture content of a sheet set (placed) in the paper feed device 6 based on the moisture content in the air obtained based on the information output from the temperature/humidity sensor 141 in this manner.

The post-processing apparatus 4 includes the storage unit 150, which stores a total number of punches representing the total number of times the punching processing has been performed by the punch unit 62. Before starting a job including punching processing by the punch unit 62 (a punching job), the post-processing control unit 101 reads out, from the storage unit 150, and uses the total number of punches at the time the previous job was completed. Furthermore, when the punching job is complete, the post-processing control unit 101 updates the total number of punches by saving, in the storage unit 150, the total number of punches to which is added the number of times (the total number of times) the punching operations were performed in the job.

<Punching Control Based on Load State of Punch Unit>

In the first embodiment, the basis weight of the sheet used in the punching processing was taken into consideration as a condition under which the punch unit 62 is overloaded during punching operations. The load on the punch unit 62 during punching operations depends not only on the basis weight of the sheet, but also on the moisture content in the sheet, as well as the degree of wear (degree of consumption) of the punch 202 and the die 205. The higher the moisture content is in the sheet, the more difficult it is to cut the sheet, which increases the load on the punch unit 62 when punching holes in the sheet. Furthermore, as the punch 202 and the die 205 wear down over repeated punching operations, the intermeshing of the punch 202 and the die 205 loosens, causing the sheet to be torn when holes are punched. The looser the intermeshing of the punch 202 and the die 205 is, the greater the load on the punch unit 62 becomes.

Accordingly, the image forming system 5 of the present embodiment performs punching control taking into account at least two of the following parameters as conditions under which the punch unit 62 is overloaded: the basis weight of the sheet; the absolute moisture content in the air; and the total number of punches by the punch unit 62. The image forming system 5 skips the punching processing on the sheet when, based on these parameters, a condition under which the punch unit 62 is overloaded is satisfied.

In the present embodiment, the control unit 111 or the post-processing control unit 101 determines whether or not to perform the punching processing on the sheet to be processed using settings tables such as those illustrated in FIGS. 7A and 7B. FIGS. 7A and 7B illustrate examples of settings tables used when determining whether or not to perform punching operations using the punch unit 62, based on the total number of punches by the punch unit 62, the basis weight of the sheet, and the absolute moisture content in the air. In the settings tables illustrated in FIGS. 7A and 7B, a circle indicates that punching is possible (that punching operations are to be performed), and an "x" indicates that punching is not possible (that punching operations are to be skipped). The data in these settings tables is created in advance and stored in a non-volatile memory (not shown) of the image forming apparatus 1 or the post-processing apparatus 4 in advance.

FIG. 7A illustrates an example of a settings table used when the total number of punches by the punch unit 62 is below a predetermined threshold (500,000 punches, in this example). FIG. 7B illustrates an example of a settings table used when the total number of punches is at least the predetermined threshold (500,000 punches, in this example). The total number of punches by the punch unit 62 can be used as a parameter indicating the degree of wear of the punch unit 62. As the total number of punches increases, the punch unit 62 becomes more worn (the degree of wear increases), and as described above, the load on the punch unit 62 during punching operations increases as a result.

In the examples in FIGS. 7A and 7B, whether or not to perform punching operations using the punch unit 62 is determined for ranges of the absolute moisture content in the air (Z1, Z2, and Z3) and ranges of the basis weight of the sheet ("light", "normal", and "heavy"). Note that the ranges of the absolute moisture content in the air are defined such that Z1<Z2<Z3. For example, Z1 is defined as a range of less than 10 [g/m$^3$], Z2 as a range of at least 10 [g/m$^3$] and less than 17 [g/m$^3$], and Z3 as a range of at least 17 [g/m$^3$]. Additionally, the ranges of basis weights of the sheets are defined as "light"<"normal"<"heavy".

As described above, the greater the basis weight of the sheet subject to the punching processing is, the greater the load will be on the punch unit 62 during punching operations. Additionally, the greater the absolute moisture content in the air is (i.e., the greater the moisture content of the sheet is), the greater the load will be on the punch unit 62 during punching operations. As such, in the settings table illustrated in FIG. 7A, the range of the basis weight of the sheet for which punching operations are skipped is set to be a different range depending on the absolute moisture content in the air.

Specifically, in the settings table illustrated in FIG. 7A, when the absolute moisture content is within the range of Z1, punching processing is set to be performed even if the basis weight of the sheet is within the range corresponding to "heavy". On the other hand, when the absolute moisture content is within the range of Z2 or Z3, which are greater than Z1, the punching processing is set to be skipped when the basis weight of the sheet is within the range corresponding to "heavy". This means that when the absolute moisture content is within the range Z2 or Z3, the basis weight threshold for determining whether or not to perform punching processing on the sheet is set to a boundary between the range corresponding to "normal" and the range corresponding to "heavy". In this manner, the basis weight threshold can be set to a lower value the higher the absolute moisture content in the air is.

Additionally, as described above, as the total number of punches by the punch unit 62 increases, the punch unit 62 becomes more worn, and the load on the punch unit 62 during punching operations increases as a result. Accordingly, in this example, when the total number of punches by the punch unit 62 has become at least a predetermined threshold, the basis weight threshold for determining whether or not to perform the punching processing on the sheet is lowered, as indicated in FIG. 7B.

Specifically, in the settings table illustrated in FIG. 7B, when the absolute moisture content is within the range of Z1 or Z2, the basis weight threshold for determining whether or not to perform the punching processing on the sheet is set as follows. That is, the basis weight threshold is set to a boundary between the range corresponding to "normal" and the range corresponding to "heavy". On the other hand, when the absolute moisture content is within the range of Z3, which is greater than Z2, the basis weight threshold is set to the boundary between the range corresponding to "light" and the range corresponding to "normal". In the settings table illustrated in FIG. 7B, the basis weight threshold for determining whether or not to perform the punching processing on the sheet is set lower than in the settings table illustrated in FIG. 7A. In this manner, the basis weight threshold may be set to a lower value as the total number of punches increases.

In the present embodiment, whether or not to perform the punching processing by the punch unit 62 on the sheet is determined using the settings tables illustrated as examples in FIGS. 7A and 7B. When, based on the settings table, a condition under which the punch unit 62 is overloaded is satisfied, the punching processing by the punch unit 62 is skipped, which makes it possible to prevent the punch unit 62 from being overloaded during punching operations.

<Operation Flowchart>

Figure 8:
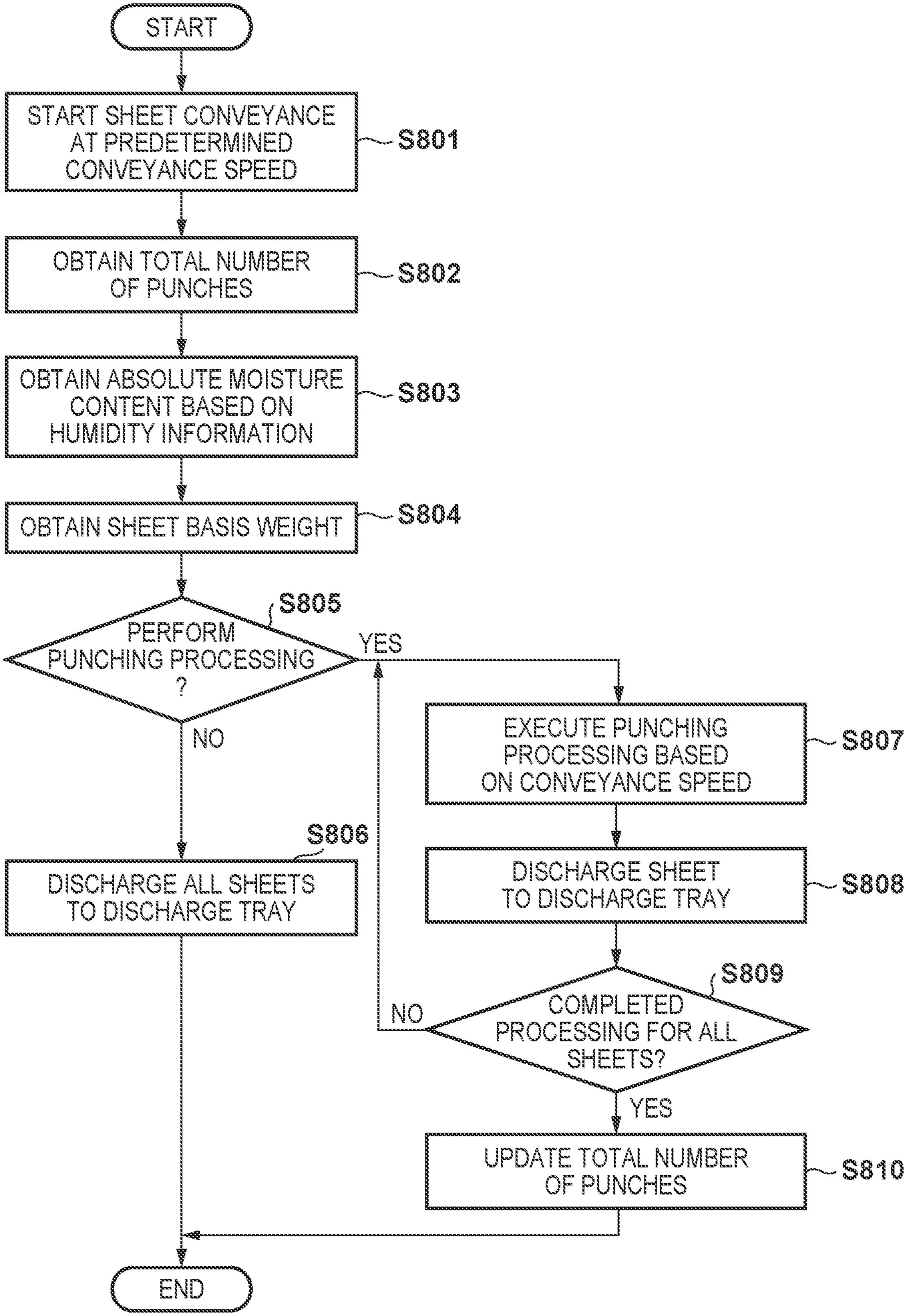
FIG. 8 is a flowchart illustrating a processing sequence for sheet conveyance control and punching control.

FIG. 8 is a flowchart illustrating a processing sequence executed in the image forming system 5 of the present embodiment. This is a flowchart illustrating a processing sequence for sheet conveyance control and punching control executed in the image forming system 5 of the present embodiment. The processing of each step in FIG. 8 is executed by the control unit 111 or the post-processing control unit 101 in the image forming system 5. The processing in the sequence illustrated in FIG. 8 is executed for a job including punching processing by the post-processing apparatus 4.

In step S801, the control unit 111 feeds a sheet from the paper feed device 6 to the conveyance path, and starts conveying the sheet at a predetermined conveyance speed, similar to step S601. Next, in step S802, the control unit 111 obtains the current total number of punches of the punch unit 62, stored in the storage unit 150, via the post-processing control unit 101, and then moves the sequence to step S803. In step S803, the control unit 111 obtains the information output from the temperature/humidity sensor 141 (the temperature/humidity information), obtains the absolute moisture content in the air based on the temperature/humidity information, and moves the sequence to step S804. In step S804, using the paper type determination device 114, the control unit 111 obtains the basis weight of the sheet being conveyed.

Then, in step S805, the control unit 111 determines (controls) whether or not to perform punching processing on the sheet being conveyed based on the total number of punches by the punch unit 62, the absolute moisture content in the air, and the basis weight of the sheet, obtained in steps S802 to S804. This determination is performed as described above, using the settings tables illustrated in FIGS. 7A and 7B.

If the punching processing is determined to be skipped, the control unit 111 moves the sequence to step S806. In this case, the control unit 111 instructs the post-processing control unit 101 to discharge all of the sheets to be processed by the job currently being executed (the sheet being conveyed and the remaining sheets to be conveyed thereafter) without performing the punching processing thereon. In step S806, the post-processing control unit 101 discharges all the sheets on which an image has been formed by the image forming apparatus 1, and which have been conveyed through the conveyance paths 30 and 40, to the discharge tray 25 without performing the punching processing, and then ends the processing of the sequence illustrated in FIG. 8.

On the other hand, if the punching processing is determined to be performed, the control unit 111 moves the sequence from step S805 to step S807. In this case, based on the sheet conveyance speed, the control unit 111 instructs the post-processing control unit 101 to perform sheet conveyance control using the conveyance motor 104 and punching control using the punching motor 102. In step S807, the post-processing control unit 101 performs the punching processing on the sheet by driving the punching motor 102 at a rotation speed corresponding to the sheet conveyance speed. Next, in step S808, the post-processing control unit 101 discharges the sheet subjected to the punching processing to the discharge tray 25.

Then, in step S809, the post-processing control unit 101 determines whether or not the punching processing is complete for all the sheets to be processed in the job being executed. If the punching processing is not complete for all the sheets, the post-processing control unit 101 returns the sequence to step S807, performs the punching processing again on the next sheet conveyed from the image forming apparatus 1, and discharges that sheet to the discharge tray 25. On the other hand, if the punching processing is complete for all the sheets, the post-processing control unit 101 moves the sequence to step S810.

In step S810, the post-processing control unit 101 updates the total number of punches by adding the number of punches performed this time by the punch unit 62 in the job being executed to the total number of punches stored in the storage unit 150, and then ends the processing in the sequence illustrated in FIG. 8.

Although the sequence in FIG. 8 illustrates an example in which the sheet basis weight detection, the determination as to whether or not to perform the punching processing, and the updating of the total number of punches are performed for each job executed, this processing may be performed on a sheet-by-sheet basis. Additionally, the image forming system 5 can be configured such that at least some of the processing executed by the control unit 111 in the sequence illustrated in FIG. 8 is executed by the post-processing control unit 101.

As described thus far, in the present embodiment, the control unit 111 (or the post-processing control unit 101) controls whether or not to perform punching processing on a sheet based on at least two of the following: the detected basis weight; the absolute moisture content in the air; and the total number of times the punching processing has been performed by the punch unit 62 (the total number of punches). According to the present embodiment, in the image forming system 5, the punch unit 62 can be prevented from being overloaded during the punching processing. This makes it possible to prevent problems from arising in the punch unit 62 due to overloading, which in turn makes it possible to prevent a drop in the quality of the punch holes formed by the punching processing due to problems in the punch unit 62.

Additionally, the processing of the present embodiment can be combined with the processing of the first embodiment. In other words, in the image forming system 5 of the first embodiment, the control unit 111 (or the post-processing control unit 101) may be configured to control whether or not to perform punching processing on a sheet based on at least two of the following: the detected basis weight; the absolute moisture content in the air; and the total number of times the punching processing has been performed by the punch unit 62 (the total number of punches).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-041762, filed Mar. 162022, which is hereby incorporated by reference herein in its entirety.

What is claimed is:

1. An image forming system including an image forming apparatus, and a post-processing apparatus which is connected to a downstream side of the image forming apparatus in a conveyance direction of a sheet and which performs punching processing of forming a punch hole in a sheet conveyed along a conveyance path from the image forming apparatus, the image forming system comprising:

a punch unit, provided in the post-processing apparatus, which includes a punch member that performs the punching processing on the sheet conveyed from the image forming apparatus while the punch member rotates;

a surface property detection unit configured to detect a surface property of the sheet conveyed along the conveyance path toward the punch unit;

a basis weight detection unit configured to detect a basis weight of the sheet conveyed along the conveyance path toward the punch unit; and a control unit configured to:

control conveyance of the sheet such that the sheet is conveyed to the punch unit at a conveyance speed corresponding to the surface property detected by the surface property detection unit, control rotation of the punch member such that the punch member performs the punching processing on the sheet conveyed from the image forming apparatus while the punch member rotates at a rotation speed corresponding to the conveyance speed, and control discharge of the sheet such that the sheet is discharged without the punching processing being performed on the sheet, in a case where the basis weight detected by the basis weight detection unit is greater than a basis weight threshold.

2. The image forming system according to claim 1, wherein the basis weight threshold is set in advance as a condition under which the punch unit is overloaded in the punching processing.

3. The image forming system according to claim 1, wherein the control unit changes the conveyance speed of the sheet to a conveyance speed corresponding to the surface property in a case where the conveyance speed of the sheet during conveyance along the conveyance path is not the conveyance speed corresponding to the surface property detected by the surface property detection unit.

4. The image forming system according to claim 3, wherein the post-processing apparatus further includes a first conveyance roller and a second conveyance roller, which are disposed upstream and downstream, respectively, from the punch unit in the conveyance path, and are configured to convey the sheet in the post-processing apparatus, and the control unit changes the conveyance speed before the sheet conveyed along the conveyance path reaches the first conveyance roller.

5. The image forming system according to claim 1, wherein the post-processing apparatus further includes:

a sensor, provided upstream from the punch unit in the conveyance path, configured to detect the sheet conveyed along the conveyance path; and a motor configured to rotationally drive the punch member, and wherein the control unit causes the punch member to perform the punching processing on the sheet by driving the motor according to a speed profile corresponding to the conveyance speed, using as a reference a timing at which a leading end of the sheet is detected by the sensor.

6. The image forming system according to claim 1, wherein the conveyance speed corresponding to the surface property is defined in advance for each of a plurality of types of sheets each having a different surface property.

7. The image forming system according to claim 1, wherein the conveyance speed corresponding to the surface property is defined in advance as a conveyance speed at which slippage does not occur between a conveyance roller and a sheet when the conveyance roller conveys the sheet in the conveyance path.

8. The image forming system according to claim 1, further comprising:

a temperature and humidity sensor configured to detect a temperature and a humidity in an installation environment of the image forming system, wherein the control unit further controls whether or not to perform the punching processing on the sheet based on at least two of the following: the basis weight detected by the basis weight detection unit; an absolute moisture content in air obtained based on information output from the temperature and humidity sensor; and a total number of times the punching processing is performed by the punch unit.

9. The image forming system according to claim 8, wherein the control unit controls the post-processing apparatus to discharge the sheet without performing the punching processing on the sheet in a case where the basis weight detected by the basis weight detection unit is greater than a basis weight threshold, and the basis weight threshold is set to a lower value the higher the absolute moisture content is.

10. The image forming system according to claim 8, wherein the control unit controls the post-processing apparatus to discharge the sheet without performing the punching processing on the sheet in a case where the basis weight detected by the basis weight detection unit is greater than a basis weight threshold, and the basis weight threshold is set to a lower value as the total number of times increases.

11. An image forming system including an image forming apparatus, and a post-processing apparatus which is connected to a downstream side of the image forming apparatus in a conveyance direction of a sheet and which performs punching processing of forming a punch hole in a sheet conveyed along a conveyance path from the image forming apparatus, the image forming system comprising:

a punch unit, provided in the post-processing apparatus, which includes a punch member that performs the punching processing on the sheet conveyed from the image forming apparatus while the punch member rotates;

a basis weight detection unit configured to detect a basis weight of the sheet conveyed along the conveyance path toward the punch unit;

a temperature and humidity sensor configured to detect a temperature and a humidity in an installation environment of the image forming system; and a control unit configured to control rotation of the punch member such that the punch member performs the punching processing on the sheet conveyed from the image forming apparatus while the punch member rotates at a rotation speed corresponding to a conveyance speed of the sheet, wherein the control unit further controls whether or not to perform the punching processing on the sheet based on at least two of the following: the basis weight detected by the basis weight detection unit; an absolute moisture content in air obtained based on information output from the temperature and humidity sensor; and a total number of times the punching processing is performed by the punch unit.

12. The image forming system according to claim 11, wherein the control unit controls the post-processing apparatus to discharge the sheet without performing the punching processing on the sheet in a case where the basis weight detected by the basis weight detection unit is greater than a basis weight threshold, and the basis weight threshold is set to a lower value the higher the absolute moisture content is.

13. The image forming system according to claim 11, wherein the control unit controls the post-processing apparatus to discharge the sheet without performing the punching processing on the sheet in a case where the basis weight detected by the basis weight detection unit is greater than a basis weight threshold, and the basis weight threshold is set to a lower value as the total number of times increases.

* * * * *